(No Model.)  2 Sheets—Sheet 1.
G. B. ADAMS.
PURSE, BAG, &c.
No. 325,807. Patented Sept. 8, 1885.
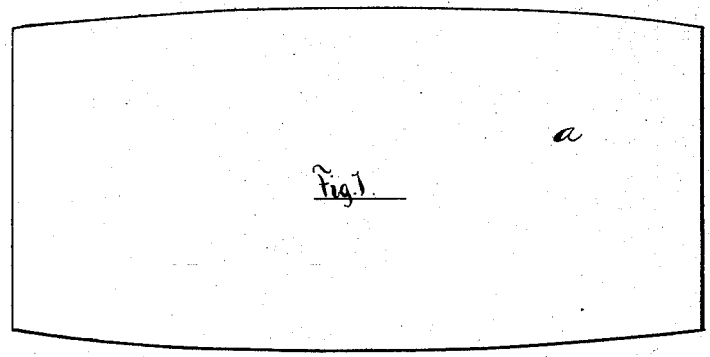
 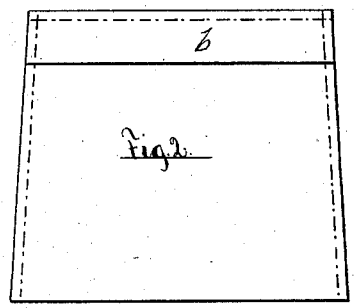 
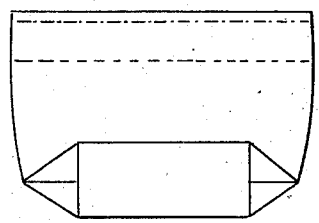 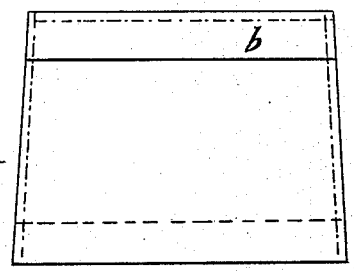 
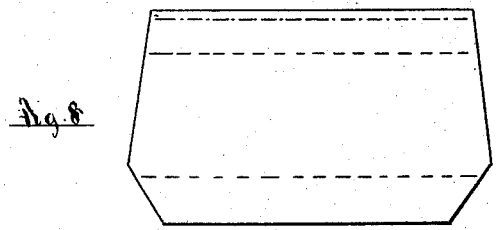 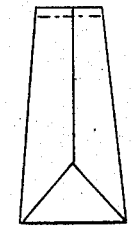
Attest.
R. H. Rowden
B. L. McNulty
Inventor.
George B. Adams.
by Fredk. F. Campbell.
Atty.
N. PETERS, Photo-Lithographer, Washington, D. C.

(No Model.) 2 Sheets—Sheet 2.
G. B. ADAMS.
PURSE, BAG, &c.
No. 325,807. Patented Sept. 8, 1885.
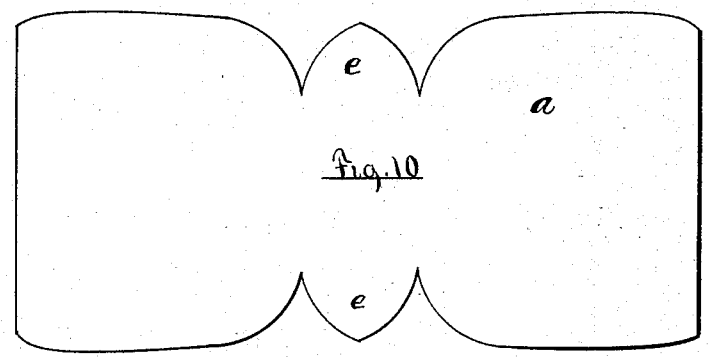
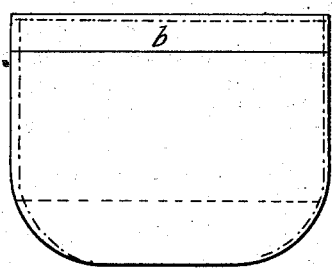
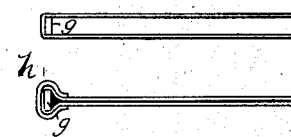
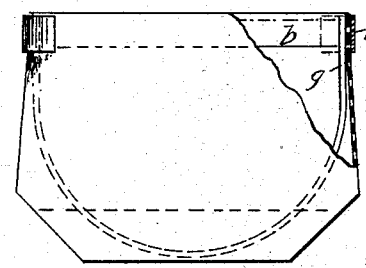
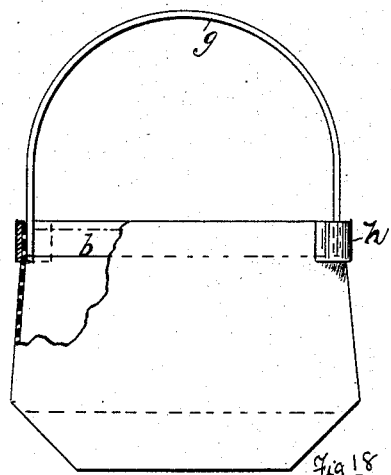
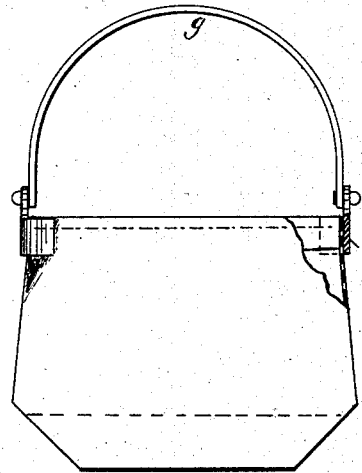
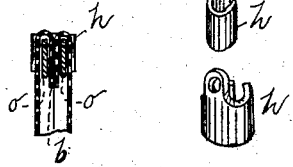
Attest:
R. H. Howden
B. L. McNulty
Inventor
George B. Adams
by Fredk. F. Campbell

UNITED STATES PATENT OFFICE.

GEORGE B. ADAMS, OF NEWARK, NEW JERSEY, ASSIGNOR OF ONE-HALF TO CHARLES CAMPBELL, OF SAME PLACE.

PURSE, BAG, &c.

SPECIFICATION forming part of Letters Patent No. 325,807, dated September 8, 1885.

Application filed May 9, 1885. (No model.)

*To all whom it may concern:*

Be it known that I, GEORGE B. ADAMS, a citizen of the United States, residing at Newark, in the county of Essex and State of New Jersey, have invented certain new and useful Improvements in Purses, Bags, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to simplify, cheapen, and more perfectly construct self-closing bags or purses; and it consists of a bag or purse made preferably of one piece of material, substantially as illustrated in the drawings, and provided with a spring, arranged either within the bag or without the same, acting as a handle, operating in either case to keep the mouth stretched longitudinally.

The invention further consists in the means employed in fastening the spring to the bag or purse, which also brings the sides of the mouth of said purse together, whereby the mouth is kept closed.

In the accompanying drawings, embodied in two sheets, Figure 1 is a plan of a blank. Fig. 2 is an elevation of said blank after it is folded and sewed in the shape of a bag. Fig 3 is a section through $x$ of Fig. 2. Fig. 4 is an end elevation of the bag, indicating the corner stitching. Fig. 5 is a side elevation of the bag shown in Fig. 2 *et seq.* after it is turned with the right side out and folded for packing. Fig. 6 is a view similar to Fig. 2, showing another method of constructing the bag. Fig. 7 is a section of Fig. 6 through $x'$, and Figs. 8 and 9 are respectively side and end elevations of the bag illustrated in Fig. 6 reversed. On Sheet 2, Figs. 10 and 11 are views of a blank and purse made therefrom. Figs. 12 and 13 are top views of the mouth of a bag before and after the clamping-clips are secured thereon. Fig. 14 is an elevation, partly sectionized, of a purse, showing the spring held therein by the clips. Figs. 15 and 16 are elevations of purses having spring-handles, indicating two methods of attaching said handles, and Figs. 17 and 18 are respectively perspective views of clamping-clips, and Fig. 19 a section taken vertically through the mouth of a bag, showing a re-enforcing piece arranged under the flap.

Three methods of constructing the improved purse or bag from one piece of material, which may be of any kind or quality, are illustrated in the drawings, Figs. 1, 2, 3, 4, and 5 representing one mode, Figs. 6, 7, 8, and 9 indicating another method, and Figs. 10 and 11 the third form and manner of construction. Fig. 1 represents a blank from which the first two kinds of purses are made, and Fig. 10 that from which the last form of bag is constructed.

By the first method the blank $a$ is folded once in the center, and the ends turned over, as in Figs. 2 and 3, and a line of stitching run near the upper edge of the turned-over portion, forming the flap $b$ within the bag. The sides of the bag are then stitched near the edges and a row of stitching run across the point $c$, Fig. 4. The bag is then turned so that the seams and flap are inside.

The second method is shown in Figs. 6, 7, 8, and 9, in which the blank is folded with an inverted V, $d$, and turned over to form the flap, as above described. The sides of the blank are then stitched and the bag reversed, the result being a bag appearing as in Figs. 8 and 9. This method is considered preferable, as it forms a more finished bag, and the folded bottom gives greater capacity, permits the bag to be compactly boxed for shipment, and also requires less work in making.

In Figs. 10 and 11 are shown a blank and bag, which are cut in, forming points $e$, folded with an inverted V, as in Fig. 7, the flaps turned and stitched, stitched near the edges, and reversed. By this method of construction a bag having rounded corners at the bottom is formed.

These various methods of constructing the bag from a single continuous piece of material are designed to illustrate some of the ways according to which it can be done, but to which the formation is not intended to be limited.

As indicated in Figs. 14, 15, and 16, the mouth of the bag is stretched longitudinally by a spring, *g*, which may be arranged within the bag, as in Fig. 14, or without, as in Figs. 15 and 16, in which case it serves the double purpose of stretching the mouth and also acting as a handle by which the bag may be carried. In both these cases the ends of the spring are secured to or within the ends of the mouth by suitable means, the preferred form of which is illustrated in Fig. 14 *et seq.*, said device consisting of a clamping plate or clips, *h*, which are clamped around the outside of the end of the purse and bind the material thereof around the spring, as indicated in Fig. 14.

In Fig. 12 is shown a plan of the mouth of the purse without the clips thereon, the sides of the mouth being kept separated by the width of the spring, which must be the result, though a thin spring-wire be used instead of the broader spring shown in the drawings, consequently necessitating the employment of some device to bring the sides of the mouth together.

In a previous patent one method of closing or filling the mouth to retain articles therein was shown, in which inside ledges were employed and the spring secured by rivets. The clips herein shown accomplish the same result, as indicated in Fig. 13, but more perfectly and economically, avoiding the use of rivets and the ledges. The clips serve the double purpose of binding the material of the purse around the end of the spring, holding it firmly therein, and also draw the sides of the mouth close together, as illustrated in Fig. 13, whereby they act in conjunction with the spring which stretches the mouth to keep the mouth of the purse closed. When the spring is arranged without the bag, it may be secured thereto by the clips in the ends of the mouth, as indicated in Fig. 15, or pivoted or secured to the clip itself, as in Fig. 16.

In Fig. 19 is shown in section the mouth of the bag, with a re-enforcing piece, *o*, arranged preferably under the flap, and extending from end to end of the mouth, being secured at each end thereof by the clips. These pieces *o* are designed to be made of strong material, to prevent the mouth of the bag from stretching when made of such fabrics which are liable to extend under the tension of the spring.

While the bags are preferably designed to be employed with a spring operating for the purpose hereinbefore described, yet they may be employed without said spring as a simple bag, and as such be used for a variety of purposes.

Having described my invention, what I claim is—

1. In a self-closing purse or bag, in combination, the body thereof having a flexible mouth, a spring operating to keep the mouth of said bag stretched longitudinally, the ends of which are secured in the ends of said mouth, and clamping-clips or metallic plates bent around the ends of the mouth of the bag or purse and the spring, and bind the material of the bag around the end of said spring and draw the sides of said mouth together, for the purposes set forth.

2. A self-closing purse or bag having a flexible mouth, a spring arranged without said bag acting as a handle and operating to keep the mouth of said bag stretched longitudinally, the ends of said spring being secured in the ends of said mouth, and clamping-clips or metallic plates bent around the ends of the mouth of the bag or purse and the spring, and bind the material of the purse around the end of said spring and draw the sides of said mouth together, for the purposes set forth.

3. A self-closing purse or bag having a flexible mouth, and provided with a spring-handle operating to keep the mouth of said bag stretched longitudinally and secured to said bag by suitable means, substantially as and for the purpose specified.

In testimony that I claim the foregoing I have hereunto set my hand this 5th day of May, 1885.

GEORGE B. ADAMS.

Witnesses:
FREDK. F. CAMPBELL,
GEORGE W. PARKHOUSE.